United States Patent [19]

O'Brien

[11] 4,384,793
[45] May 24, 1983

[54] TEMPERATURE PROFILE MONITORING METHOD AND APPARATUS

[75] Inventor: Dennis E. O'Brien, Arlington Heights, Ill.

[73] Assignee: UOP Inc., Des Plaines, Ill.

[21] Appl. No.: 219,130

[22] Filed: Dec. 22, 1980

[51] Int. Cl.³ .............................................. G01K 3/02
[52] U.S. Cl. .................................. 374/115; 374/120; 374/142; 376/274
[58] Field of Search ..................... 73/340, 341, 342; 338/25, 26, 28; 376/274; 374/120, 142, 115, 112

[56] References Cited

U.S. PATENT DOCUMENTS

| | | | |
|---|---|---|---|
| 2,944,236 | 7/1960 | Anderson | 338/26 |
| 2,976,729 | 3/1961 | Smith | 73/342 |
| 3,053,091 | 9/1962 | Braunagel | 73/342 X |
| 3,172,730 | 3/1965 | Glassbrook et al. | 374/112 X |
| 3,279,256 | 10/1966 | Rainge | 73/362 R X |
| 3,470,744 | 10/1969 | Lindberg | 374/115 X |
| 3,577,183 | 5/1971 | Gruenling | 338/26 |
| 3,719,071 | 3/1973 | Hohenberg | 374/141 X |
| 3,911,727 | 10/1975 | Katsuta et al. | 73/340 |
| 4,102,194 | 7/1978 | Eng | 73/342 X |
| 4,176,554 | 12/1979 | Kazmierowicz | 73/341 |
| 4,186,605 | 2/1980 | Bourigault | 374/115 |

Primary Examiner—Daniel M. Yasich
Attorney, Agent, or Firm—James R. Hoatson, Jr.; John F. Spears, Jr.; William H. Page, II

[57] ABSTRACT

The invention provides a method and apparatus for determining the approximate temperature profile of a large curved surface such as the outer surface of a chemical or hydrocarbon conversion reactor. At least two arrays of wire having a temperature dependent electrical resistance are placed over the surface to be monitored, with the arrays being aligned in different directions to cover the surface with a grid of overlapping wires. By measuring the resistance of each wire and comparing this resistance to predetermine reference values, wires which pass through regions of elevated temperature compared to the remainder of the surface may be located. By attributing the elevated temperatures to the area covered by the intersecting wires which show an increased resistance the areas of high temperature on the surface may be located. The system requires fewer connections and is simpler than a temperature monitoring system which requires a thermocouple or other temperature measuring means to be located at each corresponding intersecting grid point.

13 Claims, 1 Drawing Figure

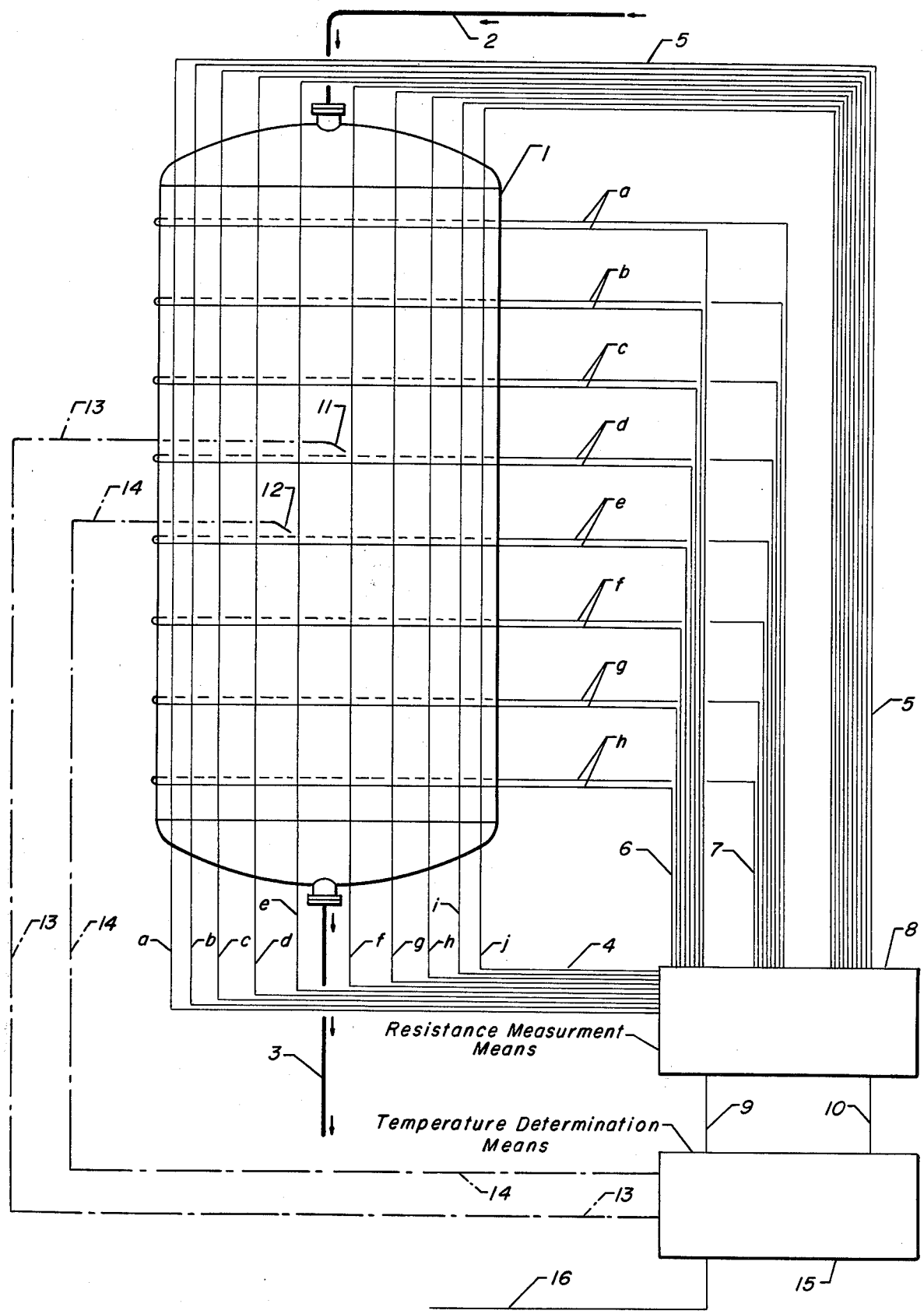

TEMPERATURE PROFILE MONITORING METHOD AND APPARATUS

FIELD OF THE INVENTION

The invention relates to a method of locating high temperature areas or measuring approximate temperatures at a number of points on a surface. The invention also relates to a system or apparatus for measuring temperature which employs electrical resistance measurements. The invention is more specifically related to a method and system for mapping a temperature profile over a large curved surface using immobile elements which are in contact with the surface. The invention is directly related to a method and apparatus for determining the approximate temperature profile of the outer surface of a process vessel used in the petroleum refining, petrochemical and chemical industries which is maintained at a relatively high temperature. The invention may also be used at the extremely low temperatures such as monitoring the surface temperature of cryogenic storage containers.

DESCRIPTION OF THE PRIOR ART

Many different types of temperature measuring apparatus have been developed including various types of bimetallic strip thermometers which could be used to monitor the temperature of a high temperature surface. However, only two types of temperature measuring devices are known to have received widespread commercial acceptance in the petroleum refining and petrochemical industries. The common means of measuring temperature is through the use of a large number of thermocouples having their junctions located at the various points at which it is desired to monitor a temperature. The thermocouples may be placed into thermowells to monitor temperatures within a process vessel or within the wall of the process vessel and would be placed on the outer surface of the vessel to monitor the skin temperature of the vessel.

A second method which is used to locate high temperature regions on a process vessel is the use of an infrared scanning device or similar apparatus which is capable of translating the radiation of a specific wave length emitted from the vessel into a temperature determination. Several of these scanning devices would be mounted at a significant distance from the vessel such that they view large sections of the outer surface of the vessel, with different devices scanning different sections of the vessel.

BRIEF SUMMARY OF THE INVENTION

The invention provides a method and apparatus for locating high temperature areas or obtaining an approximate temperature profile over a large surface area. Compared to the use of thermocouples, the invention reduces the number of electrical connections and the complexity of the wiring which is required to monitor the same number of points. One broad embodiment of the invention may be characterized as a method of detecting temperature profile irregularities which comprises the steps of establishing a first array of elongated electrically conductive elements having a temperature dependent electrical resistance across a surface which it is desired to monitor, with the elements of the first array being oriented such that a major portion of the elements are substantially parallel and are aligned in a first direction; establishing a second array of similar elongated electrically conductive elements across the surface, with a major portion of the elements of the second array being substantially parallel and aligned in a second direction such that the first and the second arrays intersect at a plurality of known points distributed across the surface; measuring the electrical resistance of each element of each array and comparing the instantaneous measured electrical resistance of each specific element with a value representative of the resistance of that element when the element or the surface is at a known temperature; and locating points on the surface at which the temperature differs significantly from said known temperature by attributing any above average increase in the electrical resistance in intersecting elements of the arrays to temperature increases occurring at the point or points of intersection of these elements. This method may be used in both extremely high temperature applications and in cryogenic applications.

A second embodiment of the invention may be characterized as comprising a system for locating relatively high temperature regions on the outer surface of a process vessel which comprises a first array of spaced-apart wires which have a temperature dependent electrical resistance located adjacent to the outer surface of a process vessel and aligned in a first direction; a second array of spaced-apart wires which have a temperature dependent electrical resistance located adjacent to the outer surface of the process vessel and aligned in a second direction, with each wire of the second array intersecting with a wire of the first array at least once at a known location on the surface of the process vessel; means to periodically measure the electrical resistance of each individual wire of the first array and of the second array; and means to compare a first value corresponding to the instantaneous measurement of the electrical resistance of each wire to a second value corresponding to a predetermined electrical resistance of that particular wire based on a calibration performed with the surface of the process vessel at a known temperature(s) and to determine the location of the intersection of any two wires from different arrays which have significantly above average increases in measured electrical resistance.

DETAILED DESCRIPTION

In many industrial situations it is desired to periodically measure the exact or approximate temperatures of various points on the outer surface of a container, enclosure or process vessel. These temperature measurements or profiles may be desired over surfaces which are flat, curved or box-like in configuration. For instance, it may be desired to monitor the temperature at various points on the inner surface or the outer surface of a furnace or similar high temperature heater to determine temperature distributions within the furnace or to determine the effectiveness of insulation applied to the exterior or interior surface of the furnace enclosure. Space vehicles and solar radiation collection panels also have surfaces which it may be desired to monitor. In these applications it may only be required to locate high temperature areas rather than measure temperatures. At the opposite end of the temperature spectrum, it may be desired to monitor the skin temperature of large cryogenic storage tanks which may be stationary or on board a ship. A very specific application for which the subject invention is believed especially well suited is the monitoring of the temperature of various process vessels used in the chemical, petrochemical and petroleum refining industries. These vessels will typically be reactors but could also be used for other purposes.

High temperature conditions are used in processing many hydrocarbonaceous liquids and vapors including petroleum-derived fractions or hydrocarbonaceous materials derived from coal or tar sand. One example of a high temperature processing operation is the hydrotreating (which includes both hydrocracking and hydrodesulfurization) of petroleum fractions. This hydrogen consuming process may be very exothermic, and these reactors operate at elevated temperatures normally above 300° C. Other reactors, such as those used in methanation processes may operate at higher temperatures, and other process vessels such as the regeneration zone of a fluidized catalytic cracking unit in which carbon deposited on a cracking catalyst is combusted with oxygen charged to the vessel operate at yet higher temperatures which may exceed 700° C. These vessels must withstand the temperatures associated with the planned conversion process, and are occasionally exposed to unplanned temperature escalations which may be caused by temporary misoperation, power failure, flow interruptions or various side reactions including very exothermic demethylation reactions. Temperature excursions may also occur within a process vessel due to the presence of specific reaction fronts. These reaction fronts may occur when carbon is being removed from the catalyst particles making up a fixed bed of catalyst held within the vessel or when the reaction catalyzed by the catalyst occurs in a very narrow band in the catalyst bed at a point at which fresh reactants contact catalyst having a high activity.

In many of these instances it is desired to monitor the temperature of the outer surface of the process vessel at a large number of points for the purpose of monitoring the reaction which is occurring within the vessel. A second reason to monitor temperatures is to ensure that the temperature at any point in the vessel does not reach or exceed the temperature limit imposed by the metallurgy of the vessel. With a vessel maintained at cryogenic conditions, a temperature profile may be desired to locate points of insulation failure or other causes of excessive heat transfer into the vessel.

If insulation is applied to the outside of a vessel which will be subjected to high temperature conditions the insulation will hinder the removal of heat from the outer surface and thereby prevent both the cooling of the vessel and the detection of "hot spots." Some safety and vessel design codes therefore require that insulation is applied to only the internal surface of vessels to prevent the possible propagation or concealment of hot spots by external insulation. This internal insulation may be subjected to extreme temperature, erosion and abrasion when placed within the vessel and is subject to localized failure and removal. The provision of an adequate temperature profile measuring system on the external surface of the vessel would reduce or eliminate the dangers associated with insulating the outer surface of a vessel subject to hot spots. This in turn would eliminate the problems associated with internally insulated vessels. It is therefore an objective of the subject invention to provide a low cost, highly reliable system for monitoring a temperature profile across an extended surface. It is another objective of the subject invention to provide a method of locating points of localized temperature excursions on the surface of an externally insulated process vessel. It is a specific objective of the subject invention to provide a method and apparatus for monitoring the approximate temperature at a large number of points on the outer surface of a process vessel or similar apparatus subjected to extreme temperatures.

BRIEF DESCRIPTION OF THE DRAWINGS

The attached drawing is representative of this invention when the temperature profile and monitoring method is applied to a petrochemical reaction vessel containing an exothermic reaction.

DETAILED DESCRIPTION OF THE DRAWINGS

The application of the inventive concept to the measurement of the surface temperature profile of a large process vessel is illustrated in the Drawing. Referring now to the Drawing, a large vertical process vessel 1 having a diameter in excess of 2 meters and a height in excess of 4 meters receives a charge stream from line 2 which comprises an admixture of heavy hydrocarbons and hydrogen. The charge stream passes downward through the vessel and through one or more beds of highly active hydrotreating catalysts maintained at hydrotreating conditions which include a temperature between 300° C. and 600° C. An effluent stream comprising the refined hydrocarbons, by-products and any unconsumed hydrogen is removed from the bottom of the process vessel through line 3 and passed to the appropriate product recovery facilities.

Two arrays of wire having a temperature dependent electrical resistance form a square grid which covers the outer surface of the vessel. The first array peels off of the large bundle of lead-in wires 4 into the individual wires a-j shown in the Drawing. It has not been attempted to show in the Drawing the equivalent vertical wires which would be placed on the reverse side of the vessel. Each of the individual sensing wires a-j of the bundle 4 extend upward to the top of the vessel. As shown in the Drawing these wires are preferably evenly spaced apart and substantially parallel while they are in contact with the cylindrical portion of the vessel, which is actinomorphic in structure. Near the top of the vessel the vertical wires extend away from the surface of the vessel and are collected into a bundle 5 which completes the connection to a resistance measurement means 8.

A second array of wires, which are attached to the bundle 6 of lead-in wires, is formed in a horizontal direction by the individual sensing wires a-h which are placed at different vertical elevations on the outer surface of the vessel. These wires are also substantially parallel and uniformly spaced apart. The wires of this array extend completely around the circumference of the vessel in contrast to the vertical wires which only extend from the top to the bottom of the vessel. As the wires emerge from completing a loop around the vessel, they are connected to a fourth bundle of wires 7 which completes the circuit by connecting the second end of this array to the resistance measurement means 8.

The resistance measurement means generates a signal identifying each specific wire which is being monitored and a signal representative of the result of a resistance measurement of that specific wire. These two signals are then transmitted to a temperature determination means 15 through means 9 and 10 for each wire of each array. The temperature determination means, preferably in conjunction with the receipt through means 13 and 14 of signals transmitted by thermocouples 11 and 12 or any other conventional temperature determination means are placed on the outer surface of the vessel, compares the instantaneous measured resistance of each wire to predetermined or calculated values for resistances through that wire and then generates a composite temperature profile for the outer surface of the vessel. This temperature profile, an alarm signal or any other desired signal is then transmitted to an output means through line 16.

The electrically conductive elements which make up the two or more arrays which intersect on the surface which is to be monitored may be formed from a wide variety of materials. Preferably these elements are metallic, and most preferably they are comprised of small gauge wire such as 20 gauge nichrome wire. Each of these elements should be electrically insulated from the vessel if the vessel is metallic and from any other potential electrical conductor including the conductive elements of the same and other arrays. This electrical insulation may consist of a ribbon of fiberglass or a woven ceramic composite. The electrical insulation should provide a minimum amount of thermal insulation, and the electrical conducting elements should be placed in as close proximity as possible to the surface which is to be monitored. That is, the wires or other conductors should be placed directly against the outer surface of the process vessel or separated from this outer surface only by the minimal required amount of electrical insulation. The electrically conductive elements (sensing wires) may extend to the resistance measurement means. However, it is preferred that a different conductor having a lower resistance and a resistance which is affected to a lesser degree by temperature changes is used to complete the connection. Thus, the sensing elements or wires may be connected to a bundle of copper lead-in or collector wires.

The electrically conductive elements may be placed on the surface in two, three, four or more arrays. The important criteria in the placement of the arrays are that the individual elements extend over all areas which it is desired to monitor, that the elements of the different arrays intersect, and that the locations of these intersections are known. As used herein, the term "intersect" is intended to indicate that two elements, each from a different array, come into extremely close proximity, with the preferred distance between the two elements being less than 6 inches and more preferably less than 2 inches. It is not necessary for the two elements to physically overlap at the point on the surface being monitored to be within sufficiently close proximity to fulfill this definition and for the subject invention to function. However, it is preferred that the elements of different arrays do cross each other to form a checkerboard-type grid over the majority of the surface. The shape of the grid which is formed by the overlapping elements will of course be dependent on the angle of intersection and the shape of the surface. With the spherical surface, the grid formed by the overlapping elements may be much like the latitude and longitude markings commonly found on a globe.

Although the same two elements may intersect at more than one point, it is preferred that each pair of elements (one from each array) intersects at only one point. The shape of the areas outlined by crossing electrically conductive elements may vary between squares, diamonds or rectangles depending on how the elements are placed on the surface. It is preferred that the elements are uniformly spaced apart over the majority of the surface of the vessel, and that the individual elements of each array are substantially parallel over a majority of their length if the shape of the surface allows such placement. Additional elements may be placed in certain critical areas which it is desired to monitor more closely for the purpose of providing more detailed temperature profiles. It is preferred that each array contains between 5 and 20 elements. However, there is no upper limit on the number of elements which may be present in any of the arrays and the arrays may therefore contain up to 200 or more elements. Each array may contain a different number of elements. The arrays need not cover the entire surface of a vessel or enclosure if it is not desired to monitor the temperatures over some portion of the vessel. It is also possible to utilize different pairs of arrays over different parts of the same vessel rather than to attempt to cover an extremely large vessel with just two arrays.

The subject invention cannot measure the exact temperature of a particular point on the surface being monitored. This is because the resistance through the conductive element which is being monitored is a composite value dependent on the temperatures present at all points along the length of the sensing wire and any wires connecting the sensing wire to the resistance measurement means. An increase in the electrical resistance of an element may therefore be the result of an extremely high temperature at one point, moderately high temperatures at two or more points, or a relatively low temperature increase along the entire length of the sensing wire. The subject system is however able to locate regions or areas of above average temperature by attributing any substantial increase in resistance to the points at which those conductive elements showing an above average increase in resistance intersect. As used herein, a term such as "a significant increase in electrical resistance" and similar terms such as "significantly elevate electrical resistance" is intended to inidcate an increase in the measured electrical resistance which is at least 5% greater, and preferably 10% greater than the average increase in electrical resistance of all of the elements of an array which are being used as compared to predetermined resistance measurements chosen as a reference standard.

To increase the accuracy of any temperature profile or temperature measurement generated according to the inventive concept the system should be calibrated prior to use. This calibration will preferably comprise a series of resistance measurements for each conductive element which is used while the surface which is to be monitored and the electrical connections leading to the monitoring means are at known temperatures. One set of resistance readings is preferably taken at an ambient temperature in the range of between 10° C. and 30° C. and at least one resistance calibration measurement is taken at a temperature close to the normal operating temperature of the surface being monitored. Calibrations are preferably performed at three and more preferably at four to seven known temperatures. This will allow the determination of the proportionality constant of the temperature-resistance relationship and a temperature estimating algorithm.

To obtain non-ambient surface temperatures during calibration it is necessary to supply the requisite heating or cooling to the surface. With a cryogenic container, this could be performed as part of a normal cooling procedure carried out prior to the use of the vessel. The vessel could be cooled though normal refrigerationtype means during this time or by the use of small amounts of the cryogenic material which is to be stored. In the case of a process vessel which is to be used at an elevated temperature, it is preferred that the temperature calibrations are performed while a high temperature fluid is passed through the vessel and with no reaction occurring within the vessel. A sizable rate of fluid transfer through the vessel should bring the outer surface of the vessel to a substantially uniform temperature, with temperature variances being primarily the result of differences in heat loss to the configuration of the vessel or the effectiveness of the insulation applied to the vessel.

It is especially preferred that the actual temperature at several points on the outer surface of the vessel is monitored during the calibration procedure by thermocouples or other point temperature measuring means which are applied in close proximity to the electrically conductive elements on the subject system. The calibration resistance measurements may be combined with these calibration temperature measurements to produce an algorithm or similar means to convert the instantaneous resistance measurements into a calculated average temperature for the surface of the vessel along each element or at specific points on the vessel. The algorithm may include values based upon the length of the sensing element and any connecting wires and the electrical resistances of these two different electrical conductors. Any calculated temperature or resistance preferably is adjusted for any temperature dependent effects. That is, the monitoring means preferably adjusts calculated values based on preliminary calculations and on actual temperature measurements.

The instrumentation necessary for the practice of the subject invention is available commercially. The resistance measurement means may be separate from or integrated with the temperature determination means or other monitoring apparatus which is being used. The instrumentation will preferably include a mini- or microcomputer which may be part of the resistance measurement means or the temperature determination means. The complexity of the operation of the subject system may be expanded to the extent allowed by the computational and memory capacity of the computer. A very simplistic system would not require means to convert resistance measurements into temperature readings and would operate only by locating the conductive elements having the significantly above average increase in electrical resistance. The next step of advancement would be either the conversion of the instantaneous resistance measurements into corresponding average temperatures or the determination of specific areas having an abnormally high temperature. As part of the program used to determine the areas of localized high temperatures, the computer may compare the resistance measurements with spot temperature readings taken over a plurality of points on the surface.

A particularly preferred capbility for the resistance measurement and temperature determination means would include comparing the indicated average temperatures of intersecting wires of two arrays and of allocating significant resistance increases to small localized lengths of these intersecting wires. The increases in resistance may then be attributed to those sections of the element which are at the above average temperature and the temperature required to produce this increased resistance over a small section of the wire may be more closely calculated. For instance, the system may detect a significant increase in resistance in one element of a first array and somewhat smaller increases in resistance in only four elements of a second array which intersects the element of the first array. From this information, it may be determined that the majority of the increase in resistance of the element of the first array may be attributed to a length equal to approximately the distance along the overlap with the four elements of the second array. In a similar manner, the increase in the resistance of each of the four elements of the second array may be attributed to a rather short length approximately equal to the distance between elements of the first array. Based on these approximate lengths, it is possible to estimate an average temperature over the small high temperature area which will produce the observed resistance increase.

The preferred embodiment of the inventive concept may be characterized as a method of detecting high temperature regions on the surface of an insulated process vessel which comprises the steps of placing a spaced-apart first array of wires having a temperature dependent electrical resistance across the surface of the process vessel, with the first array of wires being aligned in a first direction around the vessel; placing a spaced-apart second array of wires having a temperature dependent electrical resistance across the surface of the process vessel, with the second array being aligned in a second direction and intersecting the first array at a plurality of known points across the surface of the process vessel; measuring reference values representative of the electrical resistance of the individual wires of the first array and the second array while the surface of the process vessel is maintained at a known elevated temperature which is within 150 Centigrade degrees of the expected on-stream average temperature of the surface of the process vessel; comparing a value representative of the instantaneous on-stream electrical resistance of each wire of the first array and the second array with the previously measured reference value for the same wire; and locating high temperature regions on the surface of the process vessel by attributing significant above average increases in the electrical resistance of intersecting wires of different arrays to an increased temperature at the point of intersection.

I claim as my invention:

1. A method of detecting temperature profile irregularities in a reaction vessel having an outer surface containing an exothermic chemical reaction which comprises the steps of:
   (a) establishing a first array of homogeneous elongated electrically conductive elements upon said surface of said vessel and insulating said elements from said surface of said vessel which surface it is desired to monitor for temperature irregularities, with the first element array being oriented such that a major portion of the elements are aligned in a first direction;
   (b) establishing a second array of homogeneous elongated electrically conductive elements upon said surface and insulating said elements from said surface of said vessel, the second element array being oriented such that a major portion of the elements are aligned in a second direction, with the second array intersecting and crossing the first array at a plurality of known points distributed across said surface, and with the elements of the first array being electrically insulated from the elements of the second array; and
   (c) comparing a first signal representative of the instantaneous electrical resistance of each element of the first and the second arrays with a second signal representative of the electrical resistance of each one of the same elements of said first and second array determined while the surface temperature of said vessel is at a previously determined known calibration temperature;

(d) whereby points on said surface at which the temperature differs significantly from said known temperature are located by attributing any above average increase in electrical resistance in said elements to temperature variations occuring at the points of intersection of elements from the first and second arrays which show such changes in electrical resistance.

2. The method of claim 1 further characterized in that said surface is curved and in that the conductive elements follow the curvature of the surface.

3. The method of claim 2 further characterized in that the method is used to locate points on said surface which have a temperature greater than the average temperature of said surface.

4. The method of claim 3 further characterized in that said surface is cylindrical.

5. The method of claim 3 further characterized in that said surface is spherical.

6. The method of claim 3 further characterized in that conductive elements of the first array are substantially perpendicular to conductive elements of the second array at some point on said surface.

7. A method of detecting high temperature regions on the surface of an insulated process vessel containing an exothermic chemical reaction which comprises the steps of:

(a) placing a spaced-apart first array of homogeneous wires having a temperature dependent electrical resistance upon the surface of the process vessel, with the first array of wires being aligned in a first direction around the vessel and wherein said wires are insulated from said surface of said vessel;

(b) placing a spaced-apart second array of homogeneous wires which are insulated from said surface of said vessel having a temperature dependent electrical resistance upon the surface of the process vessel, with the second array being aligned in a second direction, intersecting and crossing said first array at a plurality of known points distributed upon the surface of the process vessel;

(c) measuring reference values representative of the electrical resistance of each of the individual wires of said first array and second array of wires while the surface of the process vessel is maintained at a known elevated calibration temperature which is within 150 Centigrade degrees of the expected on-stream average temperature of the surface of the process vessel; and (d) comparing a first signal representative of the instantaneous on-stream electrical resistance of each wire of the first array and a second array with a second signal representative of the electrical resistance of each one of said same wire while at the known elevated calibration temperature;

(e) whereby high temperature regions on the surface of the process vessel are located by attributing significantly above average increases in the electrical resistance of intersecting wires of difference arrays to an increased temperature at the point of intersection.

8. The method of claim 7 further characterized in that the process vessel is a reactor.

9. The method of claim 7 further characterized in that the process vessel is used to perform an exothermic reaction.

10. The method of claim 9 further characterized in that the reaction comprises the oxidation of carbon.

11. The method of claim 9 further characterized in that the reaction consumes hydrogen.

12. The method of claim 7 further characterized in that the first direction is substantially horizontal and the second direction is substantially vertical.

13. The method of claim 7 further characterized in that the process vessel has a cylindrical side wall.

* * * * *